United States Patent [19]

Kurozu

[11] 4,409,022
[45] Oct. 11, 1983

[54] METHOD OF PRODUCING LOW-SULFUR, REDUCED, IRON ORE PELLETS

[75] Inventor: Shinichi Kurozu, Niihama, Japan

[73] Assignee: Sumitomo Heavy Industries, Ltd., Tokyo, Japan

[21] Appl. No.: 354,337

[22] Filed: Mar. 3, 1982

[30] Foreign Application Priority Data

Mar. 9, 1981 [JP] Japan .................................. 56-33616
Jun. 29, 1981 [JP] Japan ................................. 56-100986

[51] Int. Cl.³ .......................................... C21B 13/08
[52] U.S. Cl. .......................................... 75/36; 75/257
[58] Field of Search ............................. 75/33, 36, 257

[56] References Cited

U.S. PATENT DOCUMENTS

| | | | |
|---|---|---|---|
| 3,029,141 | 4/1962 | Sibakin et al. | 75/34 |
| 3,894,865 | 7/1975 | Wienert | 75/36 |
| 4,337,084 | 6/1982 | Keran et al. | 75/36 |

*Primary Examiner*—M. J. Andrews
*Attorney, Agent, or Firm*—Flynn, Thiel, Boutell & Tanis

[57] ABSTRACT

A method of producing reduced iron wherein pelletized materials are introduced into a furnace together with a reducing agent and a desulfurizing agent, and the pelletized materials are subjected to a reduction treatment. This method includes the step of maintaining the materials within the reducing atmosphere for at least an additional fifteen minutes once the metallization of the materials in the furnace has reached a value of 90 to 95 percent.

7 Claims, 5 Drawing Figures

METHOD OF PRODUCING LOW-SULFUR, REDUCED, IRON ORE PELLETS

The present invention relates to a method of producing low-sulfur, reduced, iron ore pellets in a reducing furnace, such as a rotary kiln. The low-sulfur, reduced, iron ore pellets are useful, for example, as a high-grade charge stock to electric furnaces for the production of steel.

In a conventional method for the direct reduction of iron ore pellets, the starting materials are produced by adding a binder and water to finely divided iron ore and then the mixture is pelletized to form pellets, usually substantially spherical, porous balls, having a size of from 10 to 15 millimeters. Thereafter the pellets are fed into a travelling grate furnace 1 (refer to FIG. 1) so as to be dried and indurated therein. The indurated pellets obtained in the grate furnace are, in turn, introduced into a rotary kiln 2, together with a solid reducing agent 3 and a flux material 4. The iron ore in the pellets is reduced to metallic iron in the kiln 2 and then the pellets are discharged from the kiln and are cooled in a cooler to obtain the product (metallized pellets).

U.S. Pat. Nos. 3,420,656, 3,642,465 and 3,865,574, the entire contents of which are incorporated herein by reference, disclose the preparation of iron ore pellets in which the binder used to form the iron ore pellets is a liquid hydrocarbonaceous material, such as residual petroleum oil, so that the pellets contain an internal reductant. Pellets prepared in this way have numerous advantages which are pointed out in the above-referenced patents, to which attention is invited. Such pellets are coked and then fed into a reducing kiln together with flux material and an external reductant. A difficulty with this process is that the liquid hydrocarbonaceous material and the external reductant contain varying amounts of sulfur, a portion of which can remain in the reduced iron ore pellets and render them unsuitable for use as a charge stock for an electric furnace. In this regard, it is desired that reduced iron ore pellets suitable for use as a charge stock for an electric furnace shall contain less than about 0.03 wt. % of sulfur.

U.S. Pat. No. 3,865,574 describes a process involving the use of various special calcining conditions in order to reduce the sulfur content of the iron ore pellets to less than 0.25 wt. %. In order to achieve high metallization of the pellets, it is necessary to slowly heat the pellets from 1500° F. to an upper temperature of 1800°–2500° F. and then maintain the pellets at that upper temperature for an extended period of time. Thus, the overall duration of the reduction process is relatively long and careful control of the operating conditions is required. Moreover, the sulfur content in the reduced pellets is significantly lower than 0.03 wt. %.

If the pellets are such that they contain a considerable amount of sulfur, e.g., pellets containing petroleum residuum, in the early stage of the reduction, desulfurization is promoted by the volatile matter contained in the internal and external reducing agents and/or by adding flux material which also is effective as a desulfurizing agent, while heating the pellets, within the kiln, under a predetermined heat pattern, whereby to reduce the iron ore to metallic iron.

In the case described above, the amount of sulfur content, in some instances is initially reduced to the desired value, i.e., to 0.03 weight percent or less. However, when the external reducing agent introduced through the inlet of the kiln contains a large amount of sulfur and exhibits a relatively low reactivity as a reductant, such as petroleum coke, as distinguished from higher reactivity reductant, such as coal, a problem arises in that sulfurization is caused by the progress of the reduction reaction.

The present invention has been devised in the light of the above-described circumstances.

The object of the present invention is to provide a method for producing low-sulfur, highly metallized, reduced, iron ore pellets.

In this description, the term "metallization", referring to the iron in the pellets, expressed in percent, is equal to metallic Fe/total Fe $\times$ 100.

According to the present invention, the foregoing object is attained by providing a method for producing pellets containing highly metallized iron and less than about 0.03 wt. % of sulfur which comprises the step of maintaining the pellets within the reducing atmosphere for an additional time period of at least fifteen minutes after the metallization of the pellets has reached a value of 90 to 95 percent. The present invention is based on the discovery that, although the sulfur content of the pellets in the reducing furnace increases as the pellets become progressively more metallized during the intermediate portion of the reducing process, after the pellets have reached a metallization of about 90 to about 95%, the sulfur content thereof diminishes thereafter so that after an additional period of about 15 minutes, at the reduction temperature, in the reducing atmosphere, the sulfur content of the pellets drops to 0.03 wt. % or less.

The coked iron ore pellets supplied to the reducing kiln are prepared in accordance with the procedures described in U.S. Pat. Nos. 3,420,656, 3,642,465 and 3,865,574. Thus, the starting, finely divided, iron ore material is mixed with a liquid heavy hydrocarbonaceous material and then the mixture is formed into pellets (sometimes called green ball agglomerates) in a conventional pelletizer, such as a balling drum. The liquid hydrocarbonaceous material preferably is a high-sulfur petroleum residuum, which is available at relatively low cost. The amount of the liquid heavy hydrocarbonaceous material will be selected to provide sufficient binder so that hard, strong pellets can be formed, for example, from about 3 to 15 wt. % of the liquid hydrocarbonaceous material, based on the weight of the solid feed. The green pellets are then conveyed to a coking kiln, such as an indirectly fired travelling grate kiln, wherein the pellets are heated to coke the hydrocarbonaceous material, thereby driving off the volatile components, and resulting in the formation of hard, strong, porous coked pellets having fine grained coke substantially uniformly dispersed therein. Typically, a temperature of about 450° to 750° C. can be used in the coking kiln. The amount of reduction of iron oxides to metallic iron that occurs in the coking kiln, if any, is relatively minor. For further details concerning the formation of the coked pellets, reference may be had to the patents mentioned above.

The coked pellets, while hot, are transferred to the charge end of a reducing kiln, which preferably is a rotary kiln. A flux material and a solid reductant are fed into the reducing kiln, together with the pellets. As the pellets travel through the reducing kiln, they are heated to the final reducing temperature and thereby the iron oxides in the pellets are reduced to metallic iron.

The final (maximum) temperature to which the coked pellets are heated in the reducing kiln is in the range of from about 950° C. to about 1150° C., preferably from about 1000° to 1100° C.

The solid reducing agent supplied to the charge end of the reducing kiln with the pellets preferably is a high-sulfur petroleum coke, which is readily available at relatively low cost. The use of petroleum coke is highly advantageous because it contains low ash which contributes to the ease of operation in the rotary reducing kiln.

The flux material supplied to the charge end of the reducing kiln is limestone or dolomite.

The coked iron ore pellets, the solid external reducing agent and the flux material are fed into the charge end of the reduction kiln, and they move together to the discharge end of the reduction kiln. The reduction of the iron oxides in the pellets is accomplished by carbon monoxide that is formed by gasification of the internal and external reducing agents. The energy requirement of the process is provided by combustion of volatiles and carbon monoxide with air in the free space above the bed. After the desired, highly metallized, low sulfur pellets are formed in the reduction furnace, they are cooled under non-oxidizing conditions and usually are then subjected to screening and magnetic separation.

The invention, both as to its organization and method of operation, together with further objects and advantages thereof, can best be understood by reference to the following description taken in connection with the accompanying drawings in which.

DESCRIPTION OF THE PREFERRED EMBODIMENT

Figure 1:
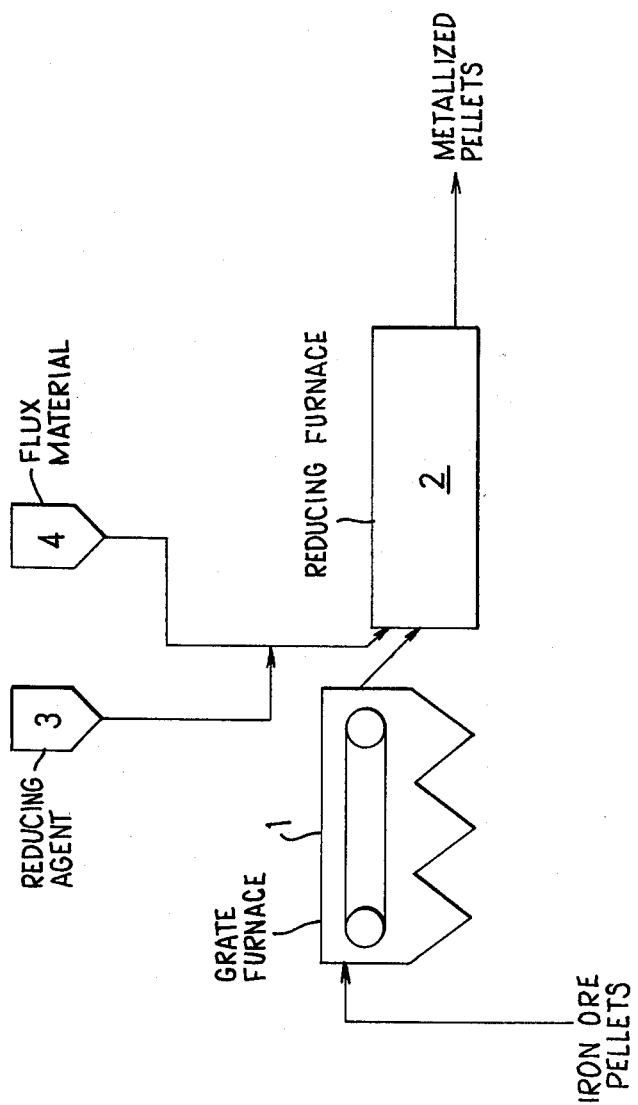
FIG. 1 is a diagrammatic view of an apparatus employed for carrying out the direct reduction of iron ore to produce metallic iron by the method of the present invention.
Figure 2:
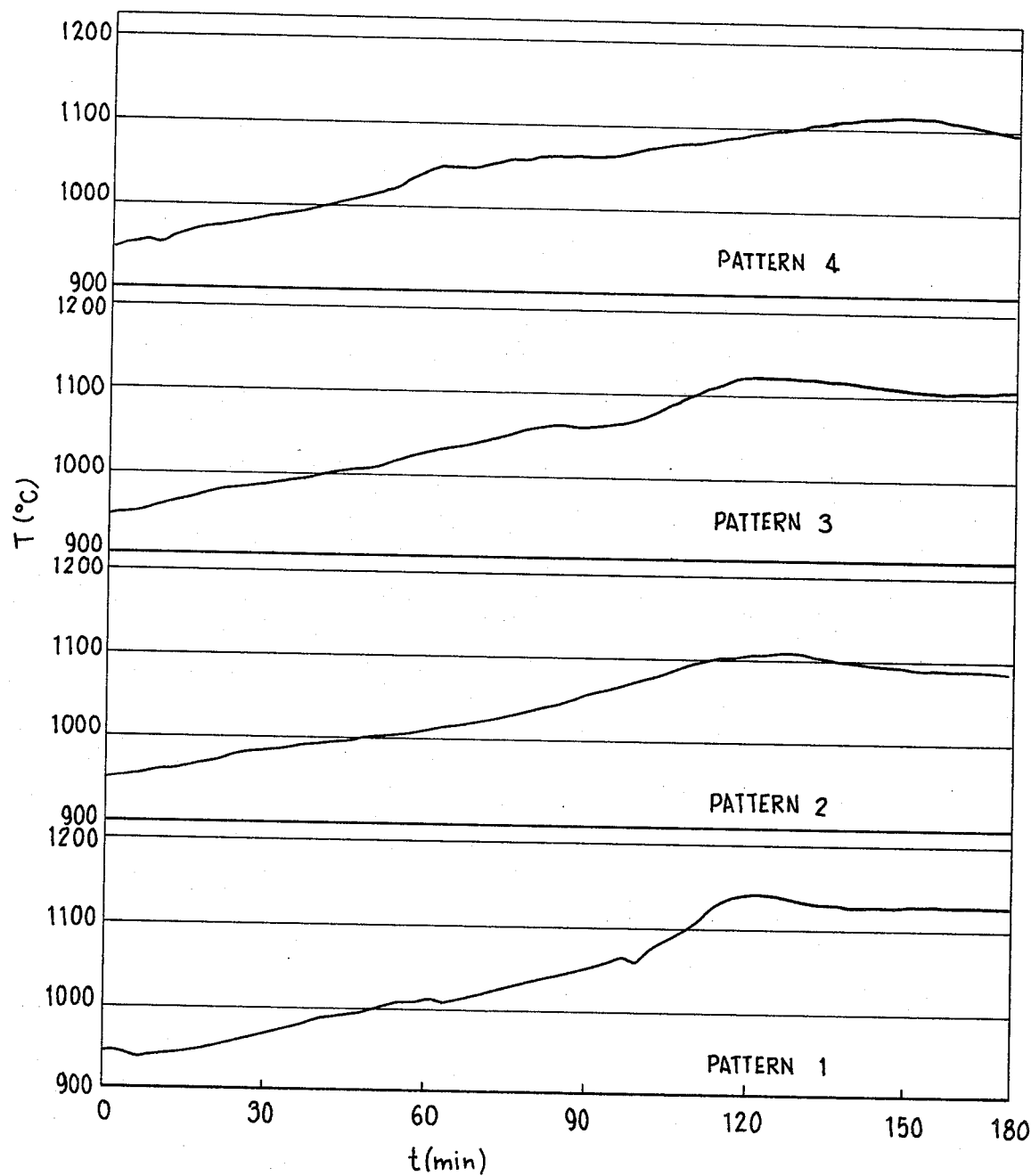
FIG. 2 is a graph showing the temperature profiles employed in a rotatable reduction furnace, operated under batch conditions, in four tests of the method according to the invention.
Figure 3:
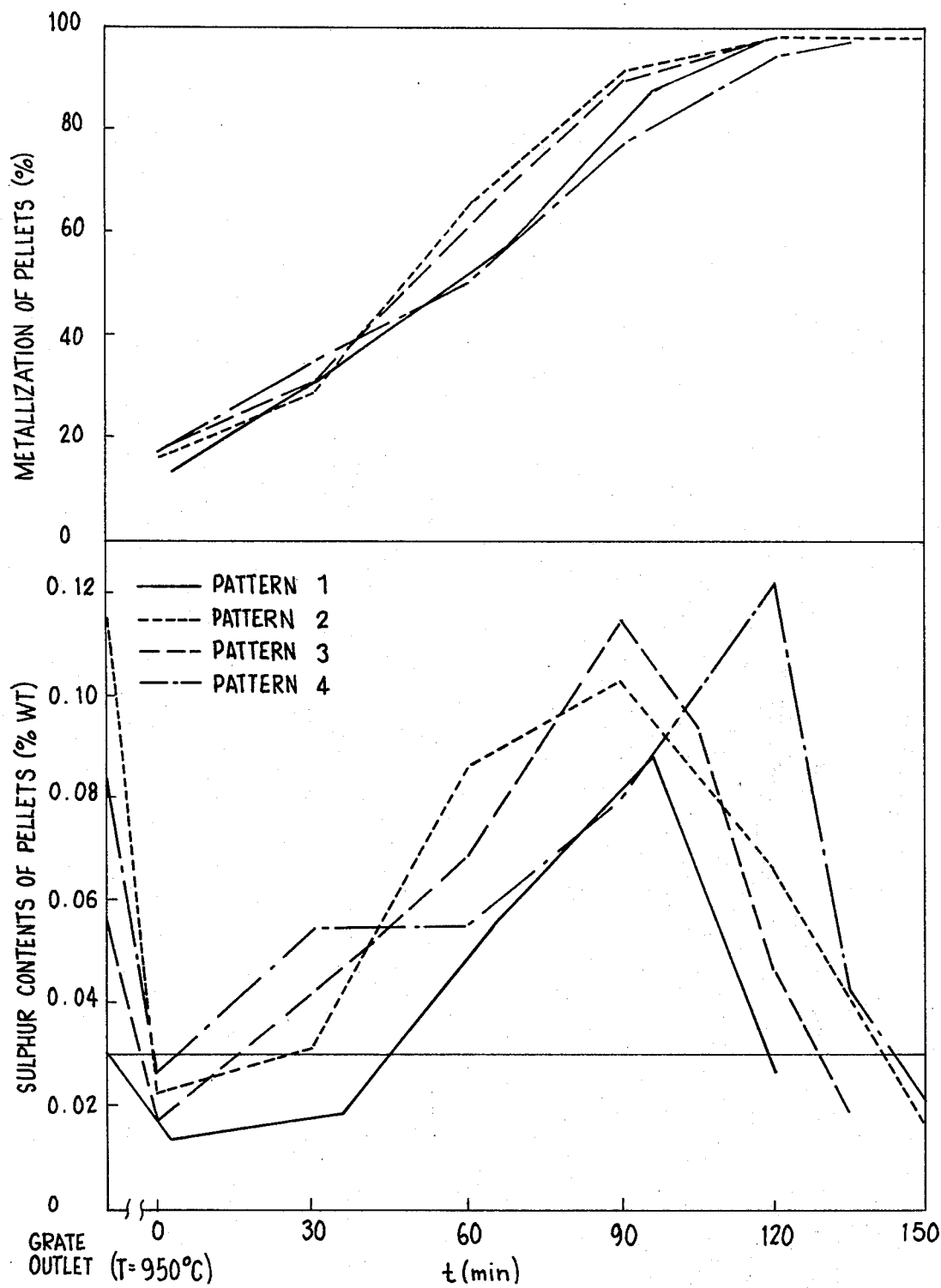
FIG. 3 is a graph showing the relationships between the metallization of the starting material and the sulfur content thereof in the four batchwise operations, using a rotatable reduction furnace.

FIG. 2 shows temperature profiles employed in four batchwise operations of the method of the invention, performed using a rotatable reduction furnace. Because these were batchwise operations, the conditions within the bed of pellets are substantially homogeneous, although the conditions vary with time as shown in FIGS. 2 and 3. In these tests, there were used coked pellets of MBR (Mineracoes Brasileiras Reunidas) iron ore, prepared using 6 wt. % of petroleum residuum as a binder. At least 90% of the pellets had a particle size in the range of 10 to 15 mm. MBR iron ore has the analysis: total iron, 68.03 wt. %; FeO, 0.30 wt. %; $SiO_2$, 0.61 wt. %; CaO, 0.04 wt. %; MgO, 0.02 wt. %; $Al_2O_3$, 0.32 wt. %; and S, 0.02 wt. %. As the external reducing agent, there was used petroleum coke having the analysis: fixed carbon, 85.69 wt. %; ash, 0.74 wt. %; volatile matter, 13.57 wt. %; sulfur, 2.23 wt. %; total carbon, 87.60 wt. %; hydrogen, 3.42 wt. %. As the flux material, there was used Hanezuru dolomite having the analysis: CaO, 36.51 wt. %; MgO, 14.97 wt. %; $SiO_2$, 0.46 wt. %; $Al_2O_3$, 0.01 wt. %; $Fe_2O_3$, 0.26 wt. %; Ignition loss, 46.42 wt. %. The pellet/coke/flux weight ratio was 1.0/0.8/0.2.

Figure 4:
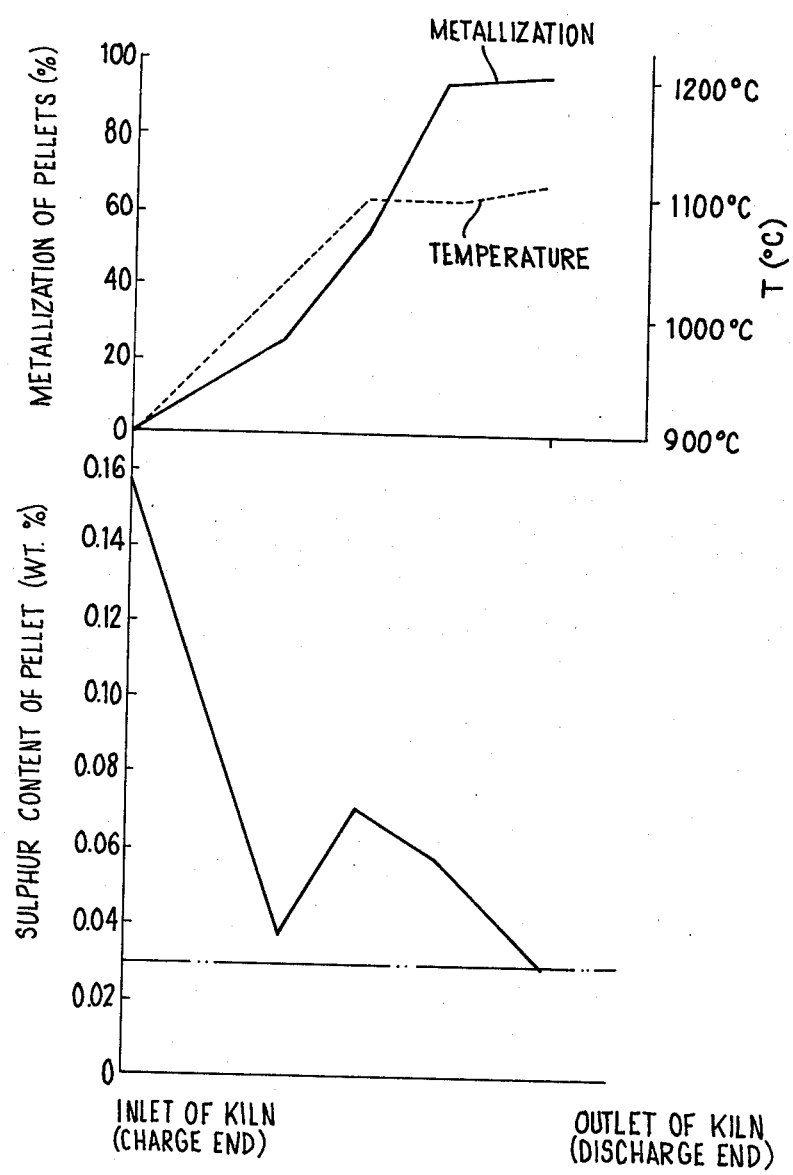
FIG. 4 is a graph illustrating the results obtained using a continuous operation in a rotary kiln.

As is apparent from FIG. 3 and FIG. 4, although the desired product sulfur content of 0.03 percent or less is obtained when the metallization is up to thirty percent, an increase of the sulfur content occurs when the metallization increases to a value above about 30 percent.

When the metallization reaches a value of 90 to 95 percent, however, the sulfur content thereafter diminishes, over a period of about 15 to 30 minutes, to a value which is less than the maximum desired sulfur content (0.03 percent). In the region of more than 90% in metallization, $CO/CO_2$ ratio in the bed gas is considerably high so that the following reactions can occur to reduce the sulfur content of the product pellets to less than about 0.03 wt. %.

$FeS + CO = Fe + cos$

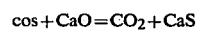

$cos + CaO = CO_2 + CaS$

Therefore, according to the present invention, the reduced pellets are maintained, as they are, in the reducing atmosphere and at the reducing temperature for an additional time period of at least fifteen minutes after the metallization of the pellets has reached a value of 90 to 95 percent. In this manner a highly metallized and low sulfur pellet product can be easily obtained.

In the test using a commercial, inclined rotary kiln as a reducing furnace and operating it continuously, there were used the same materials and the same proportions as described above. In a commercial rotary kiln, the conditions at any one location in the rotary kiln do not substantially vary with time, but the conditions change along the kiln length as the bed of pellets slowly flows down the kiln. The results of this test are shown in FIG. 4. The period of residence time of the pellets in the kiln after the pellets achieve a metallization of at least 90% is at least 15 minutes. Although there is no critical upper limit on the time that the pellets remain in the kiln after they achieve a metallization of at least 90%, in order to maximize the production rate, it will normally be desirable that the pellets not remain in the kiln for more than about 30 minutes after they achieve at least 90% metallization, provided that the sulfur content of the pellets is below about 0.03 wt. % when the pellets are discharged. In this test, there was used a rotary kiln having a diameter of 1050 mm. and a length of 11,000 mm. and which was rotated at 0.61 RPM. The total residence time of the pellets in the rotary kiln was 220 min. The analysis of the product pellets was: total Fe, 96.22 wt. %; metallic Fe, 93.00 wt. %; $SiO_2$, 0.90 wt. %; CaO, 0.06 wt. %; MgO, 0.03 wt. %; $Al_2O_3$, 0.50 wt. %; S, 0.026 wt. %; C, >0.10 wt. %. The metallization was 96.7 wt. %, the bulk density of the pellets was 1.4 ton/$m^3$ and the size range was 6 to 15 mm.

Figure 5:
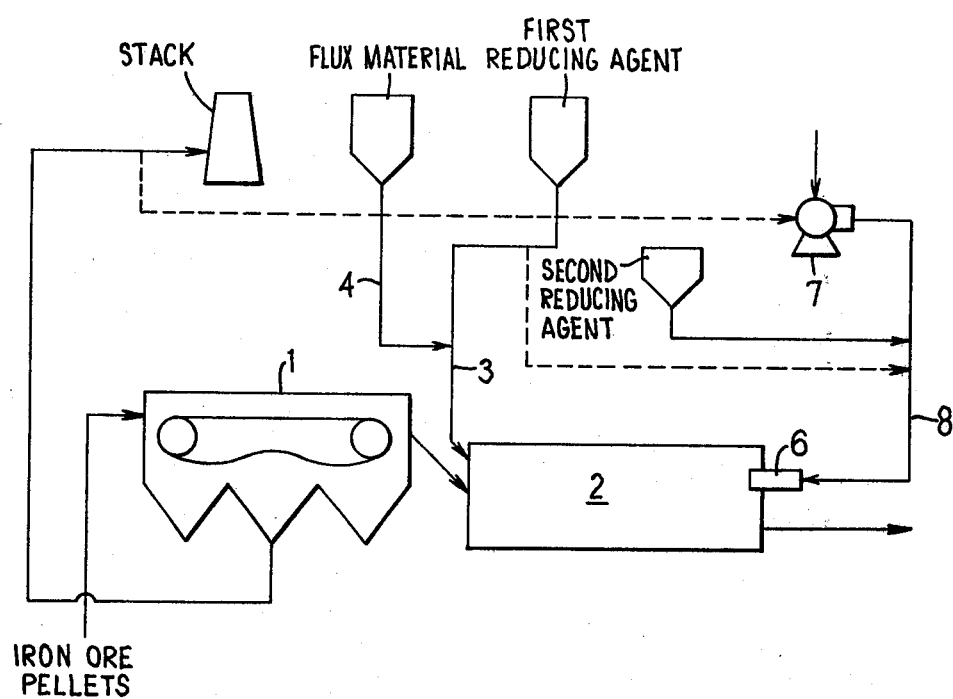
FIG. 5 is a schematic diagram of a second embodiment of the invention.

In the process for the production of low sulfur, metallized, iron ore pellets, according to a second embodiment of the present invention, coked pellets produced as described previously are fed into a rotary kiln 2, along with the flux material 4 and the solid reducing agent 3 (see FIG. 5). A second reducing agent 8 is introduced through the outlet end of the rotary kiln and is fed into contact with the pellets at a location at which the degree of metallization of the pellets has reached a value of less than about 90%, in order to forcibly effect desulfurization of the pellets. The heat required during the last stage of the reduction reaction is supplemented by the heat produced by the combustion of the volatile component of the second reducing agent. In consequence, highly metallized products with a low sulfur content can be obtained.

With reference to FIG. 5, the discharge end of the rotary kiln 2 is provided with an inlet nozzle 6, through which a second external reducing agent 8 is introduced into the kiln by means of a blower (or compressor) 7. The carrier gas employed for the introduction of the second reducing agent can be ambient air or the exhaust gas from the grate furnace 1. In a case in which air is employed as the carrier gas, the air is preheated by heat exchange with the exhaust gas of the grate furnace when necessary. The reducing agent should be introduced at a location at which a degree of pellet metallization of less than about 90 percent has been reached. The second reducing agent introduced into the kiln is a hydrocarbonaceous material having a hydrogen content of from about 3 to 5 wt. %. The amount of said second reducing agent is adjusted to provide sufficient hydrogen so that the following reactions can occur to reduce the sulfur content of the product pellets to below about 0.03 wt. %:

$$FeS + H_2 \rightarrow Fe + H_2S$$

$$H_2S + CaO \rightarrow H_2O + CaS$$

Introduction of the second external reducing agent as described above decreases the sulfur content of the pellets and results in a remarkable desulfurization phenomenon owing to the activity of hydrogen contained in the second reducing agent. This makes it possible to obtain metallized iron with less than a 0.03 percent by weight of sulfur. In addition, the amount of heat required at the closing stage of the reduction reaction is in part supplied by heat produced by combustion of a portion of the volatile component of the introduced reducing agent, and by radiation of heat by the powdery reducing agent 8 scattered in the free space above the bed resulting high heat transfer rate due to high emissivity of the flame caused by such a powdery reducing agent mentioned above being contained in the flame. In this way a highly metallized iron of low sulfur content can be produced in a relatively short period of time.

I claim:

1. A method of producing pellets of highly reduced iron oxide material, which pellets have a low sulfur content, which comprises: in a reducing furnace, heating a charge mixture of starting pellets of iron oxide material, a desulfurizing agent and a carbonaceous reducing agent of high sulfur content and low reactivity, to an elevated reduction temperature effective to generate a reducing atmosphere of carbon monoxide, and reacting said iron oxide material with said carbon monoxide to reduce said iron oxide material to metallic iron until the metallization of said iron oxide material has reached a value in the range of from 90 to 95 percent whereby to obtain pellets of highly reduced iron oxide; and thereafter maintaining said pellets of highly reduced iron oxide in said reducing furnace, at said reduction temperature and in contact with said reducing atmosphere of carbon monoxide, for at least fifteen minutes whereby to reduce the sulfur content of said pellets of highly reduced iron oxide.

2. A method according to claim 1, wherein said starting pellets have been produced by mixing a liquid hydrocarbonaceous binder with iron ore and pelletizing the mixture to obtain green pellets of from 10 to 15 millimeters in diameter, and then coking said green pellets.

3. A process according to claim 2, wherein said reducing furnace is a rotary kiln.

4. A process according to claim 2, wherein said carbonaceous reducing agent is petroleum coke.

5. A method for producing pellets of highly reduced iron oxide material, which pellets contain less than about 0.03 weight percent of sulfur and have a degree of metallization of more than about 95 percent, which comprises: feeding into the charge end of a rotary reducing kiln, coked pellets of iron oxide material which have been prepared by pelletizing a mixture of particles of iron oxide material and a liquid hydrocarbonaceous material as a binder whereby to obtain green pellets and then coking said green pellets, said coked pellets containing uniformly distributed therein particles of internal reductant formed by coking of said liquid hydrocarbonaceous material, and simultaneously feeding into said rotary reducing kiln (1) a flux material effective as a desulfurizing agent and (2) particles of high-sulfur petroleum coke as an external reductant, whereby to form a charge mixture consisting essentially of said coked pellets, said flux material and said external reductant; heating said charge mixture as it moves through said rotary reducing kiln to a final maximum reduction temperature of from 950° to 1150° C. effective to generate in said charge mixture a reducing atmosphere of carbon monoxide, and reacting said iron oxide material with said carbon monoxide to reduce said iron oxide material to metallic iron until the metallization of said iron oxide material has reached a value in the range of from 90 to 95 percent whereby to obtain pellets of highly reduced iron oxide; and thereafter maintaining said pellets of highly reduced iron oxide in said rotary reducing kiln, at said final reduction temperature and in contact with said reducing atmosphere of carbon monoxide, for from about 15 to 30 minutes, whereby to reduce the sulfur content of said pellets of highly reduced iron oxide to less than about 0.03 weight percent.

6. A method according to claim 5 in which said flux material is limestone or dolomite.

7. A method according to claim 5 in which said final reduction temperature is from about 1000° to 1100° C.

* * * * *